(12) United States Patent
Fabiyi et al.

(10) Patent No.: US 7,309,432 B1
(45) Date of Patent: Dec. 18, 2007

(54) SYSTEM AND METHOD FOR ELIMINATING SLUDGE VIA OZONATION

(75) Inventors: Malcolm Ezekiel Fabiyi, Lagrange Park, IL (US); Richard A. Novak, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 11/541,100

(22) Filed: Sep. 29, 2006

(51) Int. Cl.
*C02F 3/00* (2006.01)

(52) U.S. Cl. ............ 210/604; 210/760; 210/220; 210/150; 210/194; 210/197; 210/614; 210/620; 210/97

(58) Field of Classification Search .......... 210/604, 210/760, 220, 150, 194, 192, 196, 197, 614, 210/620–627, 97
See application file for complete search history.

(56) References Cited

U.S. PATENT DOCUMENTS

| | | | | |
|---|---|---|---|---|
| 4,178,239 A * | 12/1979 | Lowther | ............ | 210/631 |
| 6,086,766 A | 7/2000 | Yasui | ............ | 210/625 |
| 6,126,842 A * | 10/2000 | Decker | ............ | 210/760 |
| 6,592,767 B1 | 7/2003 | Yasui | ............ | 210/752 |
| 6,773,597 B2 | 8/2004 | Zhang et al. | ............ | 210/609 |
| 6,942,801 B2 | 9/2005 | Nishimura | ............ | 210/622 |
| 2005/0133445 A1 | 6/2005 | Campo et al. | ............ | 210/625 |

FOREIGN PATENT DOCUMENTS

| | | |
|---|---|---|
| EP | 0645347 B1 | 3/2000 |
| EP | 0835845 B1 | 9/2001 |
| EP | 0903325 B1 | 1/2003 |
| FR | 2845682 A1 | 4/2004 |
| WO | WO 20040233371 A3 | 4/2002 |
| WO | WO 02088803 A2 | 11/2002 |

* cited by examiner

*Primary Examiner*—Chester T. Barry
(74) *Attorney, Agent, or Firm*—Robert J. Hampsch

(57) ABSTRACT

A system and method for the treatment and reduction of sludge via ozonation in a wastewater treatment process is disclosed. The sludge treatment system comprises: a sludge ozonation reactor coupled to an activated sludge treatment basin and adapted to receive a liquid stream of sludge containing biosolids from the activated sludge treatment basin. The sludge treatment system also includes an ozone-enriched gas injection system operatively coupled to the reactor and adapted to inject ozone-enriched gas into the liquid stream at or upstream of the sludge ozonation reactor. The sludge ozonation reactor is configured to allow effective gas-liquid contacting between the ozone-enriched gas and the liquid stream so as to oxidize the biosolids in the liquid stream and initiate bacterial cell lysis thereby reducing the biosolids. Upon reduction of the biosolids, the liquid stream is returned via a return line to the activated sludge basin or other discharge point.

21 Claims, 4 Drawing Sheets

SYSTEM AND METHOD FOR ELIMINATING SLUDGE VIA OZONATION

CROSS REFERENCE TO RELATED APPLICATIONS

None

FIELD OF THE INVENTION

The present invention relates to methods and systems for activated sludge treatment and more particularly, to the utilization of ozone for the reduction of biosolids in the activated sludge treatment process.

BACKGROUND

Traditional methods of wastewater treatment involve bringing wastewater streams into contact with bacteria either in an aerobic or anaerobic type process in what is known as activated sludge treatment. These bacteria consume parts of the substrate material or waste contained in the wastewater, which are typically organic compounds containing carbon, nitrogen, phosphorus, sulfur, and the like. Typically, a portion of the waste is consumed to further the metabolism of the bacterial cells or maintain the physiological functioning of the bacterial cells. In addition, a portion of the waste is also consumed as part of the process of synthesis of new bacterial cells. The activated sludge treatment process yields a certain amount of sludge and associated solids which must be continuously removed from the treatment basin to maintain the steady state sludge balance which is critical to the effective functioning of the activated sludge treatment system.

In order to maintain waste removal capacity of the treatment plant at steady state it is important to control the generation of new bacterial cells within the activated sludge treatment process. Too much synthesis of new bacterial cells in excess of what is required for the treatment of the waste at or near steady state results in excess biosolids formation attributable to the accumulation of such newly synthesized but unneeded bacterial cells. This excess biosolids must be continuously removed during the activated sludge treatment process.

Existing methods for dealing with the removal of sludge includes transporting the sludge to landfills, utilization of sludge for land application or agricultural purposes, and incineration of the sludge. Most sludge disposal operations require some prior treatment of the sludge; a process known in the art as solids handling. Solids handling processes are often costly and time consuming operations and typically involve one or more of the following steps: (a) the concentration of the sludge in a thickener, usually requiring the use of polymers; (b) digestion of the sludge in order to stabilize the bacteria and to further reduce the volume and pathogen content of the sludge; (c) dewatering of the sludge to reach approx 15-25% solids content; which involves the passage of the sludge through centrifuges or other solid-liquid separation type devices; (d) storage of the sludge; and (e) transportation to sites for landfill, land application by farmers, or other end use.

It is estimated that the costs associated with solids handling and disposal processes can be between 20-60% of total operating costs associated with the overall wastewater treatment process. Due to the cost and time associated with solids handling and disposal, it is beneficial to minimize the amount of excess sludge produced in the wastewater treatment process.

In conventional activated sludge treatment systems and methods, oxygen is required both for the chemical oxidation of the substrate material (i.e. waste) as well as for the synthesis of new cells and metabolic processes of the bacterial cells. Use of ozone in addition to oxygen for the treatment of sludge has also been reported. More particularly, ozone treatment of sludge has been reported in combination with mechanical agitators and/or a pump providing the motive mixing. The sludge-ozone contact typically occurs in a continuously stirred tank reaction (CSTR) mode, and lysis (breaching of the integrity of the cell wall) results as a consequence of the strong oxidizing action of ozone on the cell walls. Lysis leads to the release of the substrate rich cellular content of the bacterial cells. In this way, the solid cells which would otherwise have been discharged as excess sludge are lysed, and by so doing, they are transformed to substrate which can then be consumed by bacteria in the treatment basin.

The cellular content is a liquid matrix which is comprised of proteins, lipids, polysaccharides and other sugars, DNA, RNA and organic ions. Because of the low selectivity that occurs when sludge ozone contacting is carried out in a continuously stirred reactor mode, excessive amounts of ozone are consumed using prior methods for sludge ozonation. In addition, some prior reported uses of ozone required specialized pre-treatment or modification of the sludge. Such pre-treatments and modifications may include adjusting the pH of the sludge, increasing the temperature of the sludge, increasing the pressure of the ozone treatment vessel, or passing the sludge through anaerobic pre-digestion steps. Thus, the prior use of ozone in the treatment of sludge involved additional complexity, materials, equipment and the increased costs associated therewith.

Three major methods for reactor systems are known, these being the Continuously Stirred Tank Reactor system (CSTR), the higher selective Plug Flow Reactor (PFR) and the Batch Reactor System (BRS). The major difference between the different reactor modes lies fundamentally in: (i) the average amount of time that a molecule stays within the reaction space, also known as the residence time distribution; (ii) the interaction between reacting 'parcels' e.g., there is significant back-mixing in the CSTR, while the PFR is characterized by very limited, if any, back-mixing; and (iii) the yield obtained. Batch Reactor Systems are typically applied for small scale wastewater treatment operations.

SUMMARY OF THE INVENTION

The invention may be broadly characterized as a method of reducing sludge in a wastewater treatment process. In one aspect, the method of sludge reduction comprises the steps of: (a) treating wastewater in an activated sludge basin; (b) diverting a liquid stream containing biosolids from the activated sludge basin to an ozonation reactor; (c) introducing an ozone-enriched gas to the liquid stream at or upstream of the ozonation reactor in a controlled manner that promotes effective liquid-gas contacting between the liquid stream and the ozone-enriched gas and optimizes the residence time distribution of the biosolids in the ozonated stream; (d) reacting the ozone and the biosolids in the liquid stream to achieve bacterial cell lysis thereby facilitating the elimination of the biosolids; and (e) discharging the ozonated liquid stream to the activated sludge basin or other discharge point.

The invention may also be characterized as a sludge treatment system. In this regard, the sludge treatment system comprises: an ozonation reactor coupled to an activated sludge treatment basin and adapted to receive a liquid stream containing biosolids; a source of ozone-enriched gas; a gas injection system coupled to the source of ozone-enriched gas and adapted to inject ozone-enriched gas into the liquid stream at or upstream of the ozonation reactor; and a return conduit coupled to the ozonation reactor for transporting the ozonated liquid stream to a discharge point. The ozonation reactor is a high selectivity reactor, such as a plug flow reactor adapted for controlling residence time distribution of the biosolids to facilitate lysis of the biosolids and overall reduction of the sludge.

Finally, the invention may also be characterized as a treatment process comprising the steps of: directing a liquid stream containing biosolids to a high selectivity ozonation reactor; introducing an ozone-enriched gas to the liquid stream to induce lysis of the biosolids through the interaction of the biosolids with ozone within the ozonation reactor; and discharging the ozonated liquid stream containing by-products resulting from the induced lysis to a bioreactor for further bio-oxidation of the by-products; wherein the ratio of biosolids reduced in kilograms to ozone usage in kilograms is equal to or greater than 10.

BRIEF DESCRIPTION OF THE DRAWINGS

The above and other aspects, features, and advantages of the present invention will be more apparent from the following, more detailed description thereof, presented in conjunction with the following drawings, wherein.

Corresponding reference numbers indicate corresponding components throughout the several views of the drawings.

DETAILED DESCRIPTION

In conventional activated sludge treatment systems and methods, oxygen is required both for the chemical oxidation of the substrate material as well as for new cell synthesis and metabolic processes of the bacterial cells. The oxygen requirement for the chemical oxidation of the substrate material in the treatment process is often referred to as the Chemical Oxygen Demand (COD) whereas the oxygen requirement for the removal of the substrate via the consumption of substrate for new cell synthesis and the maintenance of metabolic processes of the bacterial cells is referred to as the Biological Oxygen Demand (BOD).

Figure 1:
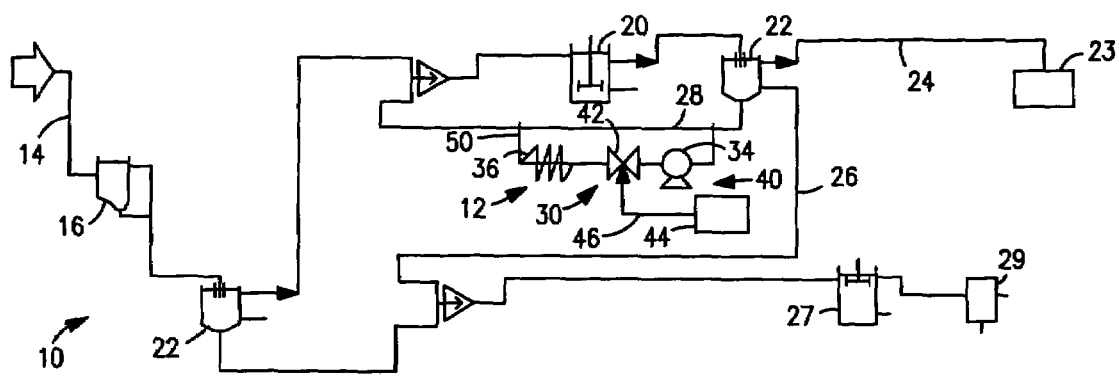
FIG. 1 is a schematic representation of an activated sludge treatment system incorporating an embodiment of the present sludge ozonation system and process.

FIG. 1, shows a schematic illustration of an activated sludge treatment system (10) incorporating an embodiment of the present sludge ozonation system (12). As seen therein, the typical activated sludge treatment system (10) includes an intake conduit (14) adapted to receive wastewater, various pre-processing devices (16) and an activated sludge basin (20), one or more clarifiers (22) adapted to separate the cleansed liquid from the accumulated sludge, an output conduit (24) for transporting the cleansed liquid to a discharge (23), a waste activated sludge line (26) and a return activated sludge (RAS) line (28) adapted to transport and return the sludge back to the activated sludge basin (20). Also shown are a digester (25) and dewatering device (27). Unlike prior art systems, where the biosolids are included as part of the waste activated sludge (WAS), the biosolids are also transported along the RAS line (28) from the clarifiers (22) to the activated sludge basin (20). Along the way, a prescribed amount of the liquid including the sludge and biosolids is diverted to the sludge ozonation reactor (30) for ozonation. However, the diverted stream need not be treated or modified prior to entering the reactor (30). The present sludge ozonation system (12) and process involves use of a reactor (30) designed to provide for the realization of a high selectivity reaction scheme operatively coupled to the RAS line (28). In the illustrated embodiment, the reactor is preferably a plug flow reactor (30) which takes a sidestream (32) from the RAS line (28).

The total sludge volume flow rate through the plug flow reactor (30) preferably ranges from about 1 times the equivalent volumetric flow rate of the waste activated sludge (WAS) to about 40 times the equivalent volumetric flow rate of the waste activated sludge (WAS). This range of between about 1 to 40 times the equivalent volumetric flow of the waste activated sludge (WAS) establishes in part, the optimum gas to liquid ratio within the plug flow reactor (30). Preferably, the gas to liquid ratio should be less than or equal to 1.0. Total sludge volumetric flow rate is adjustable and is preferably controlled in conjunction with ozone-enriched gas flow and ozone concentration in the ozone enriched gas flow in the plug flow reactor, to achieve the desired level of reduction in biosolids while minimizing required ozone dosage.

As seen in FIG. 1, the diverted sludge sidestream (32) is passed through a pump (34) to a sludge ozonation reactor shown as the plug flow reactor (30). The plug flow reactor (30) includes a sufficient length of pipe (36) that together with the flow rate assures a residence time of the sludge in the plug flow reactor (30) that is adequate for ensuring effective dissolution of the ozone and reaction of the ozone with the biosolids. The illustrated embodiments also include one or more gas injection systems (40) through which an ozone-enriched gas is introduced to the plug flow reactor (30). The preferred gas injector systems (40) comprises a source of ozone-enriched gas and one or more nozzles or venturi type devices (42) for injecting the ozone-enriched gas into the sludge. Preferably, the source of ozone-enriched gas is an ozone generator (44) coupled to a source or supply of oxygen gas (not shown). Alternatively, the ozone-enriched gas stream (46) can be supplied from specialized on-site ozone storage systems. Preferably, the desired concentration of ozone is greater than or equal to 6%. Higher concentrations of ozone are preferably as such higher concentrations helps ensure that the gas to liquid ratio in the sludge contactor is maintained within an optimal range.

The ozone-enriched gas is preferably supplied to the illustrated embodiment at nominal pressures and typically pressures lower than the operating pressures within the portion of the plug flow reactor (30) proximate injecting devices (42). In this manner, the ozone-enriched gas is ingested into and through the injecting devices (42) by a vacuum draw generated by the pressure drop across the injecting devices (42). However, one skilled in the art can appreciate embodiments where the ozone-enriched gas is supplied at pressures higher than the pressure within the plug flow reactor (30) or other gas-liquid contacting enclosure.

The gas injector system (40) also includes a suitable controlling means or mechanism (not shown) that allows operative control of the injection rate, timing, and volume of ozone-enriched gas. Control of the gas injection rate, injection timing, and volume of ozone-enriched gas is targeted to provide efficient gas-liquid contacting and to promote optimal dissolution of ozone into the liquid stream flowing through the plug flow reactor (30). More particularly, control of gas injecting system is preferably adjusted to be within a prescribed range of gas flow to liquid flow ratio, wherein the gas flow is ascertained from the injection rate, timing and volume of gas through the injecting devices (42) and the liquid flow represents the flow of sludge through the plug flow reactor (30). The preferred range of gas to liquid ratios is less than or equal to about 1.0. This gas to liquid ratio ensures that the gas or ozone is suitably dispersed in the liquid and further ensures that there is not an excess of gas in the fluid mix. Excessive back-mixing and churn is minimized. More importantly, the above-described gas to liquid ratio together with other related flow characteristics operate to minimize excessive back-mixing and churn as well as avoid stratification of the respective flows.

Having passed through the plug flow reactor (30), the ozonated sludge is returned to the plant RAS line (28) via a return line (50). Alternatively, the ozonated sludge or liquid stream exiting the plug flow reactor (30) may be returned to the activated sludge basin (20) in a separate line from the rest of the RAS flow, or may be returned to a different portion of the wastewater treatment plant. Generally, if the main RAS flow is going to an anoxic or anaerobic basin, then it may be preferable for the ozonated sludge (which is now highly oxygenated also) to go to an oxic or aerobic basin. Otherwise the oxygen content of the ozonated sludge could disrupt the conditions required in the anoxic or anaerobic stages.

At the end of the RAS line (28) or return line (50) is an optional ejector mechanism, eductor, or exit nozzle arrangement (not shown) adapted to return the ozonated sludge at the surface or at a sufficient depth in the activated sludge basin (20) and to ensure good mixing of the ozonated sludge with the bulk liquid in the activated sludge basin (20). The ejector mechanism or exit nozzle arrangement (not shown) also serves to promote recovery of oxygen in the above-identified process.

The operating principles behind the disclosed sludge ozonation treatment system involve the contacting of the biosolids and dissolved ozone in a plug flow reactor, in which the primary contact and reaction of the oxidant (dissolved ozone) and the biosolids occurs. The present process requires the effective gas-liquid contacting between the liquid stream of sludge or mixed liquor and an ozone-enriched gas to promote efficient dissolution of ozone in the liquid stream. Effective gas-liquid contacting is achieved with properly designed plug flow reactors and ozone-enriched gas injection techniques.

In the reaction between the ozone-enriched gas and the biosolids in the plug flow reactor, the cell walls of the bacterial cells are breached or weakened as a result of the ozone induced chemical oxidation of the cellular walls of the bacteria. This breaching of the bacteria cell walls is known as lysis and it leads to the release of the cellular content of the bacterial cells. The cellular content is generally a liquid matrix which is comprised of proteins, lipids, polysaccharides and other sugars, DNA, RNA and organic ions. As a result of the lysis, the solid cells of the biosolids, which would otherwise have been accumulated and discharged in the solids handling process, are transformed to substrate (COD) components and subsequently consumed by the bacteria in the activated sludge treatment basin.

A plug-flow reactor is used to achieve a high selectivity of the lysis reaction by providing for a narrow range of contact time between excess bacteria cells or biosolids and dissolved ozone, so that ozone is used only for or predominately for oxidation process leading to bacteria cell lysis ("primary reaction"). Ideally, the ozone dosage and liquid-gas contact time is limited so as not to further oxidize the cell contents ("secondary reactions"). This provides for the most efficient use of ozone, leading to the maximum sludge reduction at the minimum ozone dosage. Preferred contact time ranges between about 10 to 60 seconds.

The ozone dosage ingested into the sludge is also controllable either by adjustments in ozone concentration in the gas flow or adjustments in flow rate of ozone-enriched gas injected into the sludge or both. Ozone dosage control is targeted to achieve the desired cell lysis activity at minimum ozone usage.

Figure 2:
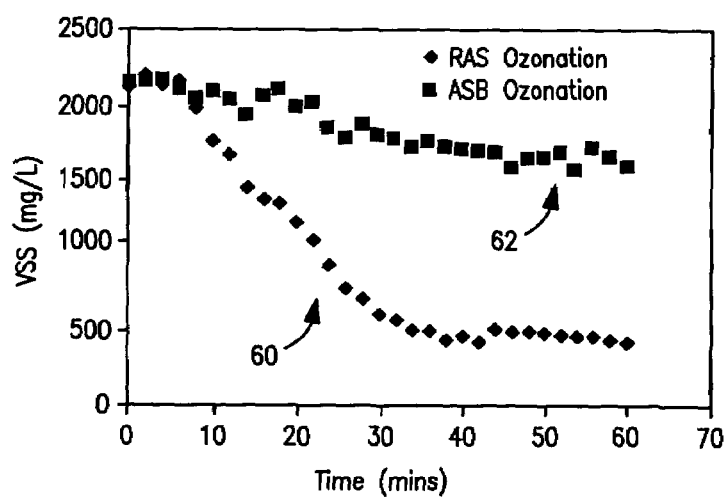
FIG. 2 is a graph that depicts the operating performance of an excess sludge treatment process in accordance with the presently disclosed embodiments.

Turning now to FIG. 2, there is illustrated a graph depicting the operating performance of an activated sludge treatment process with ozonation of sludge in the plug flow reactor in accordance with the disclosed embodiments as compared to a sludge reduction process as taught in the prior art comprising an activated sludge treatment process with ozonation applied in a continuous stirred reaction mode to a portion of the RAS, which is then returned directly to the activated sludge basin. The same ozone flow rate is applied in both examples. As seen therein, the steeper profile of the curve (60) associated with the present ozonation process indicates a faster rate at which the lysis process occurs and an overall enhanced reduction or elimination of solids per unit of ozone applied. Approximately 1600 mg/L of solids are removed within the initial 40 minutes using the current ozonation process as depicted by curve (60) compared to about 400 mg/L of solids removed using conventional ozonation process as depicted by curve (62), with the same total dosage of ozone applied in both cases.

Table 1 shows another comparison of biosolids production in a wastewater treatment facility using the above described ozonation process with biosolids production in the same wastewater treatment facility without use of the present sludge ozonation reactor and associated process.

Also, Table 2 shows a comparison of the sludge reduction performance of presently disclosed sludge ozonation system and process to various other reported sludge ozonation examples. As seen therein, the Removal Factor (i.e. kg Total Sludge removed per kg of Ozone used) of the presently disclosed sludge ozonation system far exceeds the apparent Removal Factor of systems disclosed in prior art literature.

TABLE 1

Biosolids Reduction

|  | w/o Ozonation System | W/Ozonation System |
|---|---|---|
| COD Removed (per day) | 10,000 kg | 10,000 kg |
| Ozone Consumed (per day) | 0 kg | 70 kg |
| BioSolids (SS) Production Rate | .35 kg SS/kg COD | .21 kg SS/kg COD |
| BioSolids (SS) Produced | 3500 kg | 2100 kg |
| Ozone Dosage (kg Ozone/kg SS Reduced) | 0 | .05 |
| % BioSolids Reduced | 0% | 40% |
| Ratio - kg BioSolids Reduced/kg Ozone | 0 | 20 |

TABLE 2

Sludge Reduction System Comparisons

| Reference | Ozone Dosage (kg Ozone per kg Sludge Treated) | Ozone Consumption (kg Ozone per kg Sludge Reduced) | Removal Factor (kg Sludge Reduced per kg Ozone) |
|---|---|---|---|
| Yasui et al (1996) Wat. Sci. Tech (3-4) pp 395-404 | 0.05 | 0.165 | 6.06 |
| Sakai et al (1997) Wat. Sci. Tech 36-(11) pp 163-170 | NR | 0.133 | 7.52 |
| Sakai et al (1997) Wat. Sci. Tech 36-(11) pp 163-170 | NR | 0.148 | 6.76 |
| Sakai et al (1997) Wat. Sci. Tech 36-(11) pp 163-170 | 0.034 | 0.178 | 5.62 |
| Kobayashi et al (2001) Proceedings of the 15th Ozone World Conference, London | NR | 0.250 | 4.00 |
| Sievers et al (2003) Proc. of the 3$^{rd}$ Conf for Water and Wastewater Treament, Goslar | 0.05 | 0.395 | 2.53 |
| Present Sludge Ozonation System | 0.003-0.01 | 0.050 | 20.00 |

Figure 3:
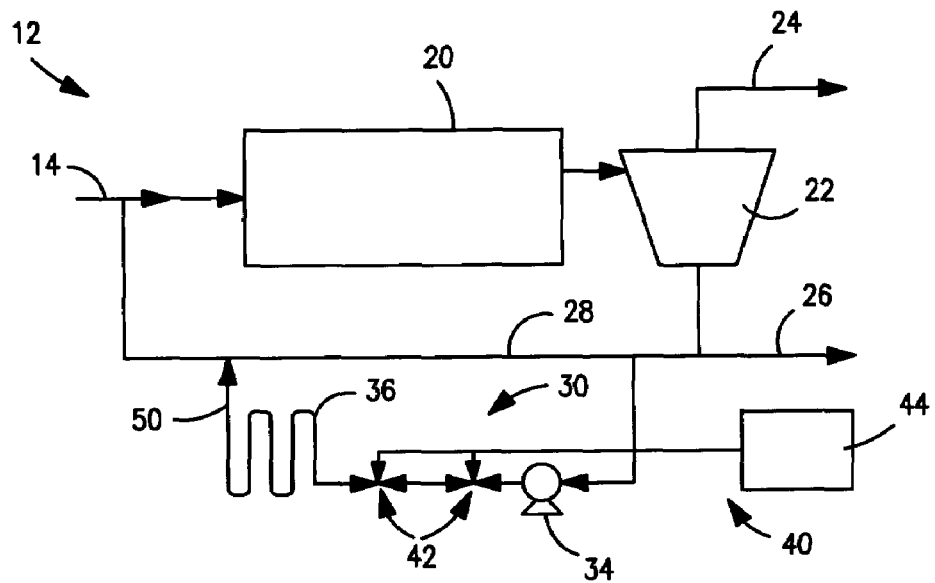
FIG. 3 is a schematic representation of an alternate embodiment of the present sludge ozonation system and process wherein ozone-enriched gas is introduced at multiple locations within the sludge ozonation reactor.

FIGS. 3-8 illustrate alternate embodiments of the present sludge treatment process. In particular, FIG. 3 illustrates an embodiment of the sludge treatment process wherein ozone-enriched gas is injected or otherwise introduced at multiple locations at or proximate to the plug flow reactor (30). Multiple point injection can be beneficial to more precisely control or realize improved gas-liquid contacting that needs to occur in the plug flow reactor (30).

Figure 4:
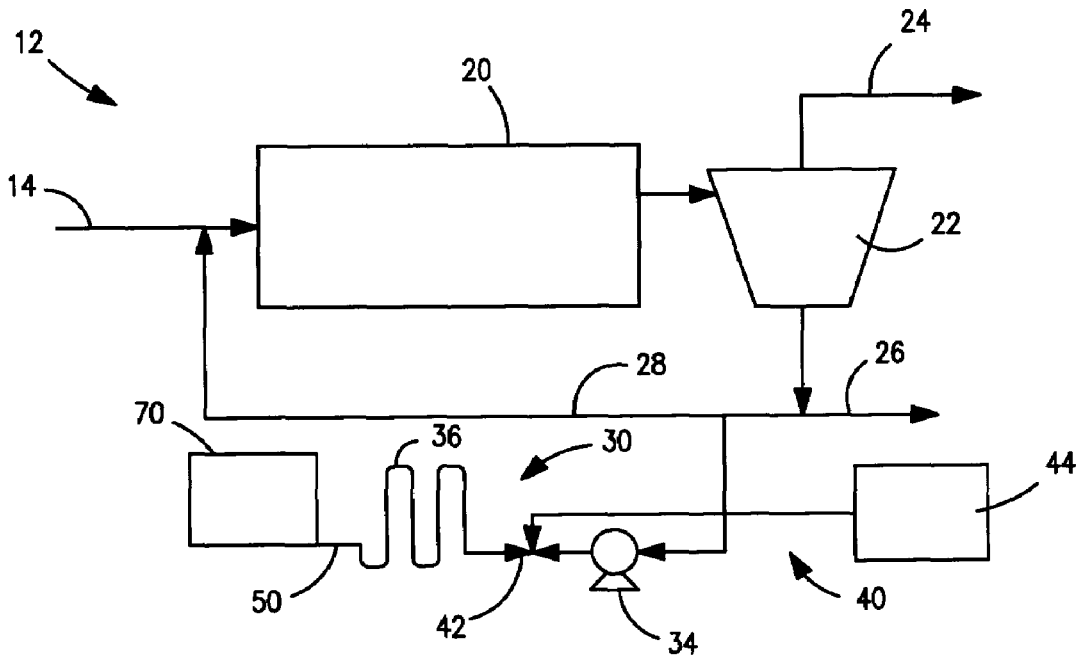
FIG. 4 is a schematic representation of another alternate embodiment of the present sludge ozonation system wherein the discharge line from the sludge ozonation reactor is coupled to some other sludge post-treatment process downstream of the reactor.

FIG. 4 also illustrates another embodiment of the present sludge treatment system and process wherein the return conduit (50) from the plug flow reactor (30) is not returned directly to the activated sludge basin (20), but rather to some other post-treatment process downstream of the plug flow reactor (30) such as a digester, sludge stabilization unit, or secondary treatment basin (70).

Figure 5:
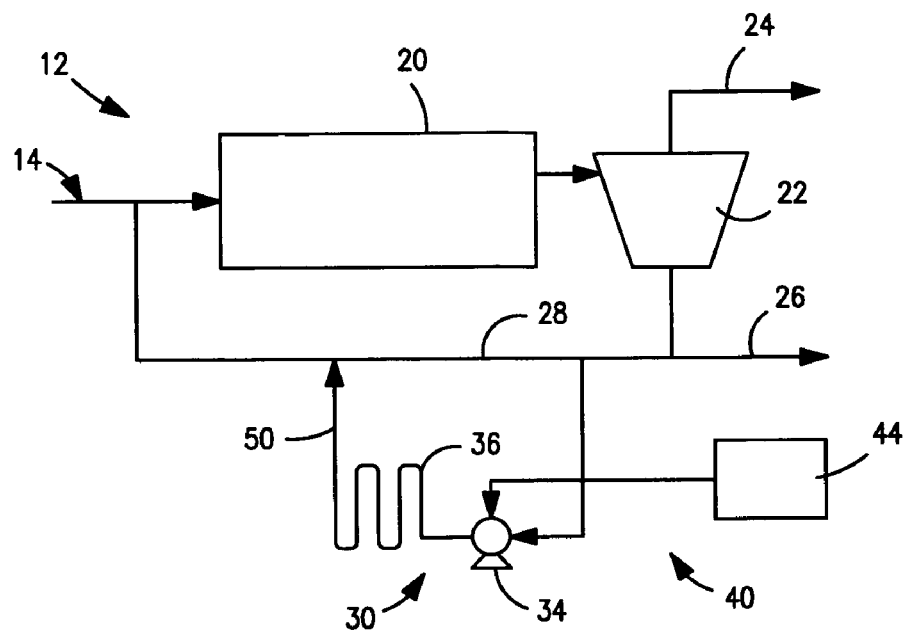
FIG. 5 is a schematic representation of still another alternate embodiment of the present sludge ozonation system wherein the ozone-enriched gas injection system injects the ozone-enriched gas at or near the pump associated with the sludge ozonation reactor.

FIG. 5 illustrates an embodiment of the present sludge treatment system and process wherein the plug flow reactor (30) includes a pump (34) and ozone-enriched gas injection system (40) adapted to inject the ozone-enriched gas at or near the pump (34).

Figure 6:
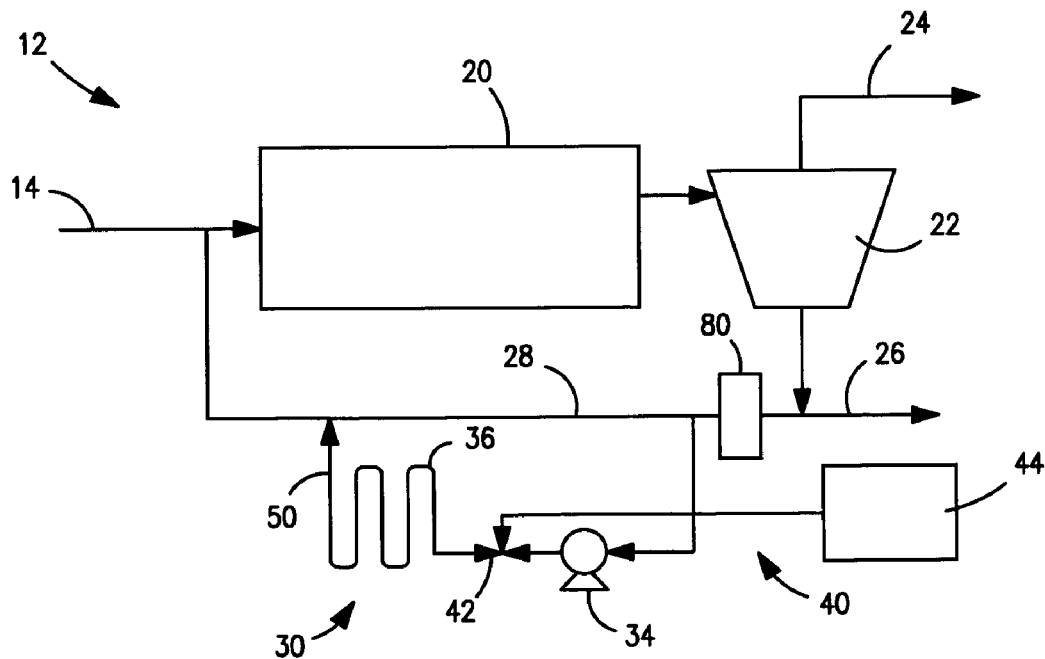
FIG. 6 is yet another embodiment of the present sludge ozonation system and process where sludge is pre-processed prior to the sludge ozonation reactor.

FIG. 6 illustrates yet another embodiment of the sludge ozonation system (12) where the sludge for treatment in the plug flow reactor (30) is pre-processed via a sludge thickener or other device for concentration of solids (80). Alternatively, the sludge to be diverted to the plug flow reactor (30) may be diluted with water (not shown) to yield a liquid stream with lower solids concentration entering the plug flow reactor (30).

Still another pre-processing or pre-treatment technique that may be employed with the disclosed embodiments of the invention involves passing the sludge through a digester or other means for sludge stabilization or solids handling prior to diversion to the plug flow reactor. Still other sludge pre-treatment techniques compatible with the present sludge ozonation system and process would include the addition of solubilizing agents to the sludge, application of ultrasonic waves, homogenization, and other mixing or agitation means. Also, the use of chemical agents that facilitate the lysis of the bacteria cells or enhance the capacity for digestion of the sludge could be used.

Figure 7:
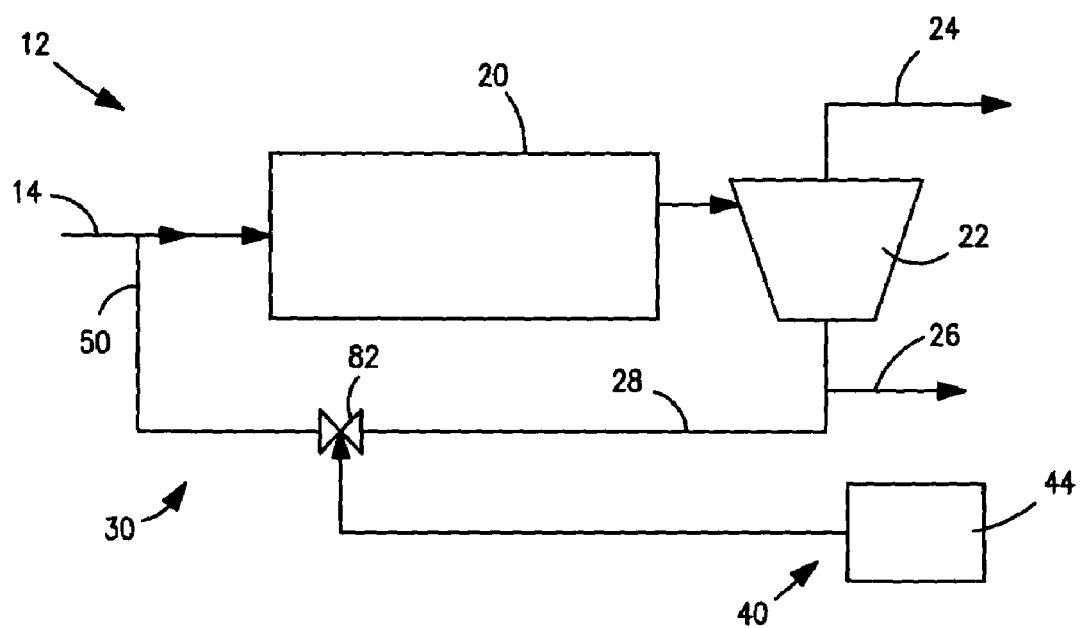
FIG. 7 is yet another alternate embodiment of the present sludge ozonation system wherein the gas-liquid contacting between the ozone-enriched gas and liquid stream occurs upstream of the sludge ozonation reactor.

FIG. 7 illustrates an embodiment of the present sludge ozonation system (12) and method where the initial gas-liquid contacting between the ozone-enriched gas and liquid stream occurs upstream of the plug flow reactor (30) and/or in the RAS line (28). In the illustrated embodiment a gas-sludge contactor device (82) such as spargers, diffusers, venturi devices or high velocity mixing nozzles is disposed upstream of the plug flow reactor (30). The gas-sludge contactor device (82) discharges the mix to the plug flow reactor (30) where the bacterial cell lysis and other reactions occur.

In those embodiments of the present sludge ozonation system and process where the initial gas-liquid contacting occurs in the RAS line (28) or upstream of the plug flow reactor (30), the ozone-enriched gas may be supplied to the headspace above the liquid stream or may be supplied under pressure to a prescribed mixing region at a prescribed orientation relative to the liquid stream (e.g. the impeller region of a mechanically agitated gas-sludge contactor device or injecting devices such as nozzles, spargers, and diffusers which are oriented at a prescribed angle and distance vis-à-vis the liquid surface.)

Figure 8:
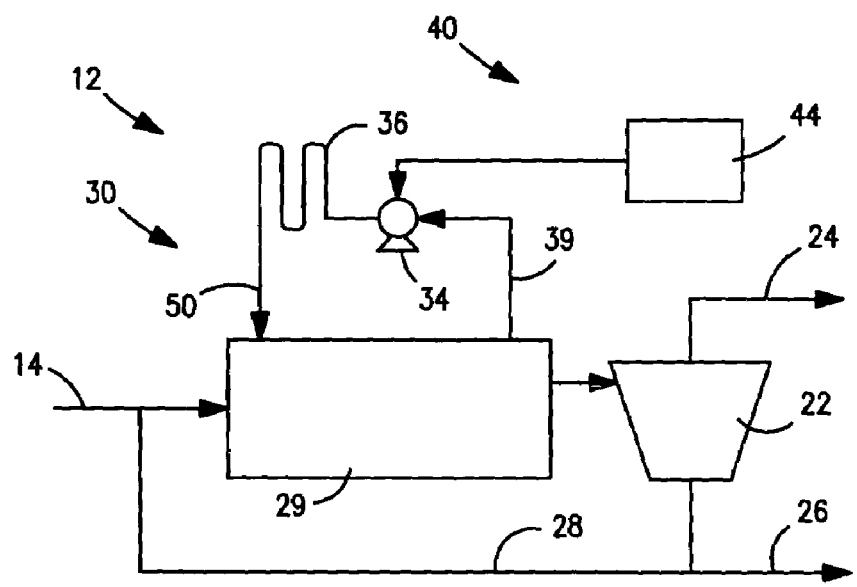
FIG. 8 is yet another embodiment of the present sludge ozonation system wherein the treated liquid stream is a mixed liquor stream from the activated sludge basin.

FIG. 8 depicts an alternate embodiments where the treated fluid is not clarifier underflow or otherwise diverted from the RAS but rather is a 'mixed liquor' fluid drawn via conduit 39 from the aerated basin 29.

For activated sludge treatment systems employing a membrane bioreactor configuration, the alternate arrangement would not involve the use of a clarifier and instead would use a polymeric or ceramic membrane unit (not shown) coupled to the plug flow reactor (30) or other high selectivity ozonation reactor. In such arrangement, the plug flow reactor or other ozonation reactor would treat with ozone a 'mixed liquor' type liquid stream.

The efficient and cost effective ozonation of sludge in the above-described embodiments requires the presence of three process conditions (i) the use of the ozone predominately for the lysis or breaching of the cells i.e., achieving a high selectivity for the lysis reaction; (ii) limiting exposure of the totally or partially lysed cells to additional ozone within the reactor, as this could lead to the complete release of the cellular contents in the reactor and the subsequent costly chemical oxidation of the released substrates by the additional ozone, rather than by the much cheaper option of bio-oxidation of the released substrates by the bacterial cells in the activated sludge basin; and (iii) the realization of a very narrow range of residence time distributions for the bacterial cells within the reactor.

By the use of a plug flow reaction approach, all of these desirable process conditions can be realized within the reactor or contactor. The plug flow reaction approach is attained specifically by designing for the sludge-ozone flow to occur with minimal back-mixing, and for the contacting to occur mostly within a mostly tubular configuration. Specifically, the illustrated embodiments have a prescribed or controlled residence time and the achievement of high selectivity of the lysis reaction. In the above-described embodiments, a plug-flow reaction is used to achieve a high selectivity of the lysis reaction by providing for a narrow range of contact time between cells and dissolved ozone (i.e. narrow residence time distribution), so that ozone is used only for the reactions leading to cell lysis ("primary reactions"), and so that ozonation does not continue so as to further oxidize the cell contents ("secondary reactions") nor to oxidize the products of the primary reactions ("tertiary reactions"). This provides for the most efficient use of ozone, leading to the maximum biosolids or sludge reduction at the minimum ozone dosage.

As described with respect to the illustrated embodiments, one or a multiplicity of gas injection points are employed to match the rate of ozone supplied for dissolution to the rate of reaction of biosolids with the dissolved ozone along the prescribed length of the plug flow reactor. This avoids over or under supply of ozone, promoting efficient use of ozone for cell lysis while avoiding use of ozone for oxidation of cell contents.

INDUSTRIAL APPLICABILITY

In utilizing the presently disclosed embodiments of the present sludge treatment process, it is desirable to control selected parameters, either through design of the system or in operation of the system. Preferably, the rate of ozone supplied for dissolution is correlated to the rate of reaction of biosolids with the dissolved ozone along the length of the plug flow reactor. This correlation of the ozone supply with the rate of biosolids reaction within the plug flow reactor avoids over-supply or under-supply of ozone and thereby promotes the efficient use of ozone for bacteria cell lysis while avoiding the use of ozone gas for the secondary reactions.

The plug flow reactor with ozone injection is designed and operated in a manner such that a single pass of sludge through the plug flow reactor achieves a nearly complete and substantially uniform lysis of unneeded or excess bacterial cells. Preferably, by varying the volume of sludge that is diverted and processed through the plug flow reactor, closely managing the residence time distribution, or varying the ozone dosage, it is possible to control the amount of sludge that is reduced. Alternatively, the high selectivity reactor can be designed and operated in a manner where several passes through the reactor are required to achieve the desired sludge removal. Also, since the residence time obtained in a Batch Reactor System is controlled within a narrow range as with the plug flow reactor, it is possible to attain good reaction selectivity with a batch reactor in lieu of a plug flow reactor.

Typical values for the Food-to-Microorganism (F/M) ratio, i.e., the ratio of the grams of substrate material entering into the activated sludge basin on a daily basis compared to the quantity in grams of bacterial cells in the activated sludge basin, range from about 0.04 to 2.0 grams substrate material per day/gram of bacterial cells, depending on the type of the activated sludge process that is utilized. Likewise, the yield of newly synthesized bacterial cells following the bacterial consumption of substrate material is about 0.2 to 0.6 kg of biosolids per kg of substrate material consumed. Thus, using the present process for ozonation of sludge, one would model or empirically determine the amount of sludge to be diverted to the plug flow reactor, the residency time, and the amount of ozone to be injected into the reactor that is necessary to reduce between about 0.2 to 0.6 kg of sludge times the average mass (in kg) of new substrate material introduced into the activated sludge basin per day. From an economic standpoint, one can calculate the cost savings of eliminating the solids handling associated with the volume of biosolids against the cost of the ozone consumed in the process.

The above-identified methods and systems for the treatment of sludge using ozone can be utilized alone or in conjunction with other sludge reduction techniques. Moreover, each of the specific steps involved in the preferred process, described herein, and each of the components in the preferred systems are easily modified or tailored to meet the peculiar design and operational requirements of the particular activated sludge treatment system in which it is used and the anticipated operating environment for given activated sludge treatment process.

For example, the source gas used in conjunction with the ozone generation system could comprise air, air enriched with oxygen, pure oxygen gas, or nearly pure oxygen gas. However, because the core activated sludge treatment process also has a basic oxygen requirement, the use of nearly pure or pure oxygen gas as a source gas is preferred. In addition, the use of pure or nearly pure oxygen source gas and the injection of the ozone-enriched gas in or near the plug flow reactor could be controlled in a manner such that all or a substantial fraction of the overall oxygen requirement for biological treatment in the activated sludge process in the activated sludge basin is provided by the sludge ozonation system.

From the foregoing, it should be appreciated that the present invention thus provides a method and system for the treatment of sludge using ozone-enriched gas. While the invention herein disclosed has been described by means of specific embodiments and processes associated therewith, numerous modifications and variations can be made thereto by those skilled in the art without departing from the scope of the invention as set forth in the claims or sacrificing all its material advantages.

What is claimed is:

1. A sludge treatment system comprising:
a plug-flow type ozonation reactor fluidically coupled to an activated sludge treatment basin and adapted to receive a liquid stream containing biosolids from the activated sludge treatment basin;
a source of ozone-enriched gas;
a gas injection system coupled to the source of ozone-enriched gas and adapted to inject ozone-enriched gas into the liquid stream in the ozonation reactor;
the ozonation reactor adapted to facilitate lysis of the biosolids and reduction of sludge; and
a return conduit coupled to the ozonation reactor for transporting the ozonated liquid stream to the activated sludge treatment basin.

2. The activated sludge treatment system of claim 1 wherein the source of ozone-enriched gas further comprises an ozone generator coupled to a source of oxygen and the ozone enriched gas is an ozone enriched oxygen gas.

3. The activated sludge treatment system of claim 1 wherein the source of ozone-enriched gas further comprises an ozone generator coupled to a source of ambient air and the ozone enriched gas is ozone enriched air.

4. The activated sludge treatment system of claim 1 wherein the source of ozone-enriched gas further comprises an ozone generator coupled to a source of oxygen enriched air and the ozone enriched gas is an ozone enriched air-oxygen mixture.

5. The activated sludge treatment system of claim 1 wherein the gas injection system further comprises one or more nozzles disposed in the ozonation reactor.

6. The activated sludge treatment system of claim 1 wherein the gas injection system gas further comprises a venturi device disposed in the ozonation reactor.

7. The activated sludge treatment system of claim 1 wherein the gas injection system gas further comprises a plurality of injecting devices disposed proximate the ozonation reactor.

8. The activated sludge treatment system of claim 1 wherein the sludge treatment system further includes a return activated sludge (RAS) line adapted to recycle activated sludge to the activated sludge basin and the ozonation reactor is coupled to the RAS line.

9. The activated sludge treatment system of claim 1 further comprising a pre-treatment subsystem interposed between the activated sludge basin and the ozonation reactor, the sludge pre-treatment subsystem adapted for conditioning the liquid stream to optimize the lysis of the biosolids in the ozonation reactor.

10. The activated sludge treatment system of claim 1 wherein the liquid stream is a mixed liquor stream.

11. The activated sludge treatment system of claim 1 wherein the liquid stream is a stream of sludge.

12. A method of sludge reduction comprising the steps of:
treating wastewater in an activated sludge basin;
diverting a liquid stream containing biosolids from the activated sludge basin to a high selectivity ozonation reactor;
introducing an ozone-enriched gas to the liquid stream at or upstream of the ozonation reactor to induce lysis of the biosolids through the interaction of the biosolids with ozone within the ozonation reactor; and
discharging the ozonated liquid stream containing by-products resulting from the lysis to a bioreactor for further bio-oxidation of said by-products.

13. The method of sludge reduction according to claim 12 further comprising the step of producing an ozone-enriched gas by generating ozone and mixing the ozone with a gas, and wherein the percent of ozone is between 6 and 15 percent by volume.

14. The method of sludge reduction according to claim 12 further comprising the step or producing an ozone-enriched gas by generating ozone and mixing the ozone with a mixture of oxygen and ambient air, and wherein the percent of ozone is between 6 and 15 percent by volume.

15. The method of sludge reduction according to claim 12 further comprising the step pre-treating the liquid stream containing biosolids.

16. The method of sludge reduction according to claim 12 wherein the step of introducing an ozone-enriched gas to the ozonation reactor further comprises injecting ozone-enriched gas at a plurality of locations within the ozonation reactor.

17. The method of sludge reduction according to claim 12 wherein the step of discharging the ozonated liquid stream further comprises discharging the ozonated liquid stream back to the activated sludge basin.

18. The method of sludge reduction according to claim 12 wherein the ozonation reactor is a plug flow reactor.

19. A method of reducing biosolids in a wastewater treatment process comprising the steps of:
directing a liquid stream containing biosolids within a wastewater treatment process to a high selectivity ozonation reactor; and
introducing an ozone-enriched gas to the liquid stream at or upstream of the ozonation reactor to induce lysis of the biosolids through the interaction of the biosolids with ozone within the ozonation reactor; and
discharging the ozonated liquid stream containing by-products resulting from the induced lysis to a bioreactor for further bio-oxidation of the by-products;
wherein the ratio of biosolids reduced in kilograms to ozone usage in kilograms is equal to or greater than 10.

20. The method of biosolids reduction according to claim 19 wherein the liquid stream is a mixed liquor stream.

21. The method of biosolids reduction according to claim 19 wherein the liquid stream contains sludge.

* * * * *